(12) United States Patent
Lynn

(10) Patent No.: US 10,155,319 B2
(45) Date of Patent: Dec. 18, 2018

(54) TOOLS FOR ACTUATING MAGNETICALLY-CONTROLLED CONNECTORS AND METHODS OF USE

(71) Applicant: David Lynn, Welcome, NC (US)

(72) Inventor: David Lynn, Welcome, NC (US)

(*) Notice: Subject to any disclaimer, the term of this patent is extended or adjusted under 35 U.S.C. 154(b) by 0 days.

(21) Appl. No.: 15/471,664

(22) Filed: Mar. 28, 2017

(65) Prior Publication Data
US 2018/0281205 A1 Oct. 4, 2018

(51) Int. Cl.
*B25J 15/06* (2006.01)
*H01R 43/26* (2006.01)
*H01F 7/20* (2006.01)

(52) U.S. Cl.
CPC .......... *B25J 15/0608* (2013.01); *H01R 43/26* (2013.01); *H01F 2007/208* (2013.01)

(58) Field of Classification Search
CPC .......... B25J 15/0608; B66C 1/04; B66C 1/06; E04B 2002/7468; F16B 5/0664; F16B 19/1081; F16B 19/109; H01F 2007/208; H01R 43/26; H02S 40/36
USPC ...................................................... 294/65.5
See application file for complete search history.

(56) References Cited

U.S. PATENT DOCUMENTS

| | | | | |
|---|---|---|---|---|
| 854,153 A | * | 5/1907 | Dodds | |
| 3,015,045 A | * | 12/1961 | Ward | H01F 7/206 294/65.5 |
| 3,298,730 A | * | 1/1967 | Soley | H01F 7/206 294/65.5 |
| 3,975,813 A | * | 8/1976 | Bell | E04F 13/088 29/270 |
| 4,185,261 A | * | 1/1980 | Nagata | H01F 7/206 294/65.5 |
| 5,125,601 A | * | 6/1992 | Monford, Jr. | B64G 1/641 244/173.1 |
| 5,485,733 A | * | 1/1996 | Hoffman | E05L 347/004 292/251.5 |
| 6,677,846 B2 | * | 1/2004 | Snider | A47L 13/40 294/65.5 |
| 9,021,841 B2 | * | 5/2015 | Kottenstette | B65D 55/14 70/168 |
| 9,694,990 B2 | * | 7/2017 | Voser | B65G 49/00 |
| 2005/0269827 A1 | * | 12/2005 | Heard | B66C 1/04 294/65.5 |

* cited by examiner

Primary Examiner — Dean J Kramer
(74) Attorney, Agent, or Firm — Coats & Bennett, PLLC

(57) ABSTRACT

A tool for selectively engaging and disengaging one or more magnetic connectors to secure a panel. The tool includes a frame with one or more magnets. The magnets provide a magnetic flux to control the magnetic connectors. In use, the tool is positioned on a first side of the panel with the one or more connectors on the opposing second side. The magnetic flux from the one or more magnets controls the positioning of the connectors between engaged and disengaged positions.

15 Claims, 10 Drawing Sheets

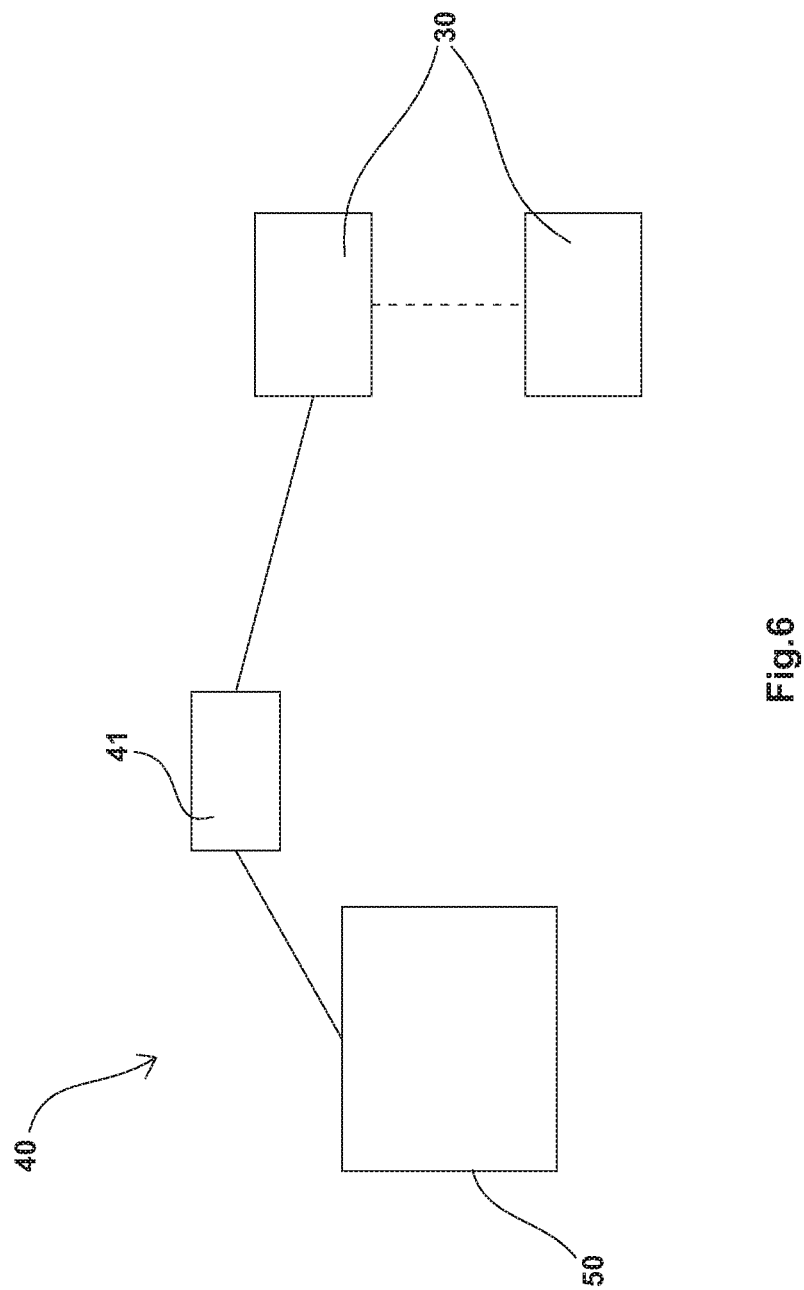

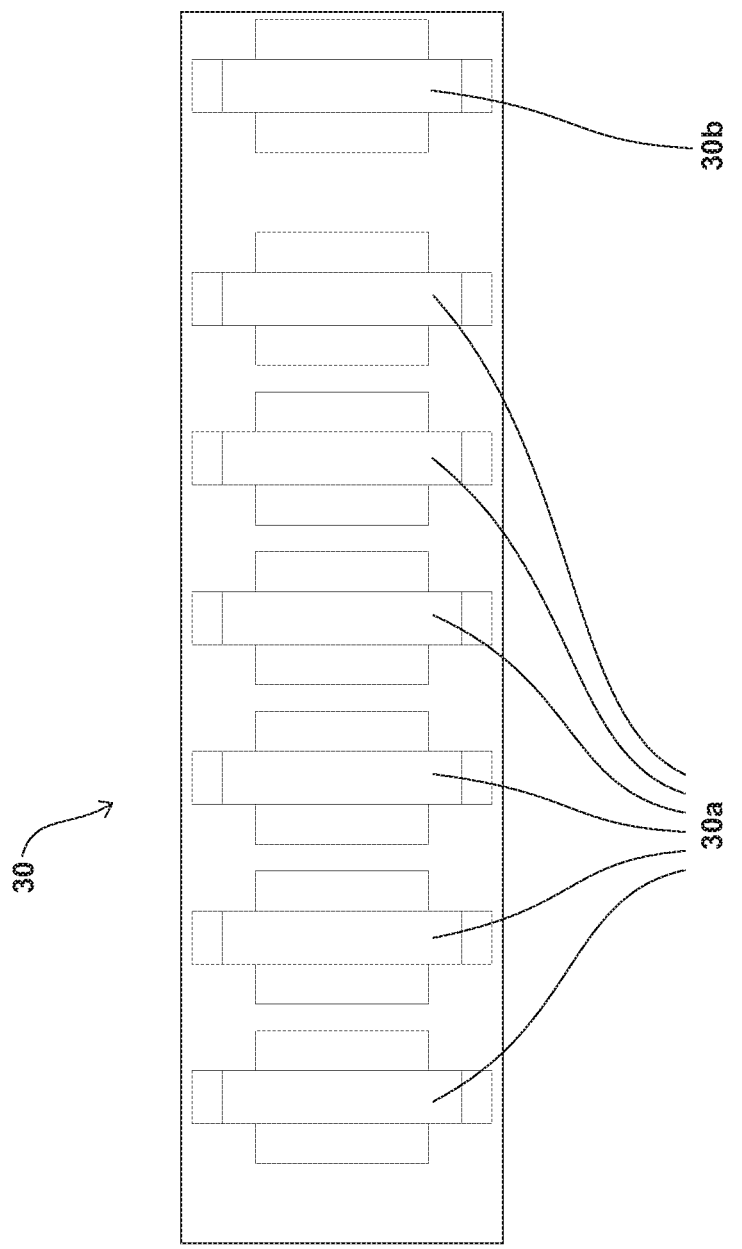

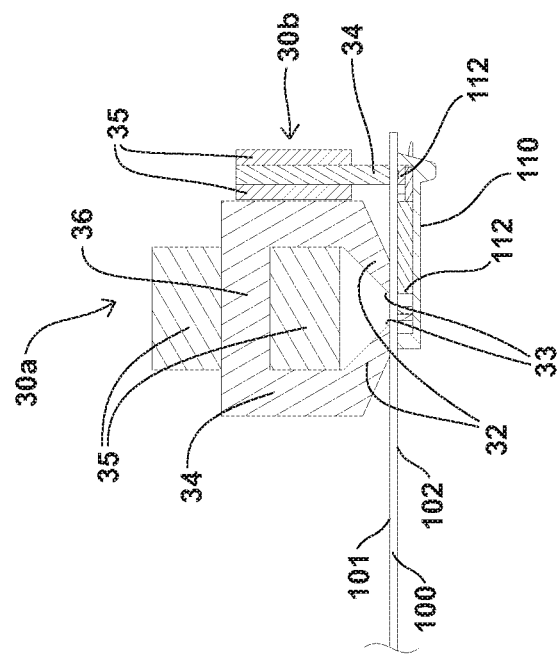
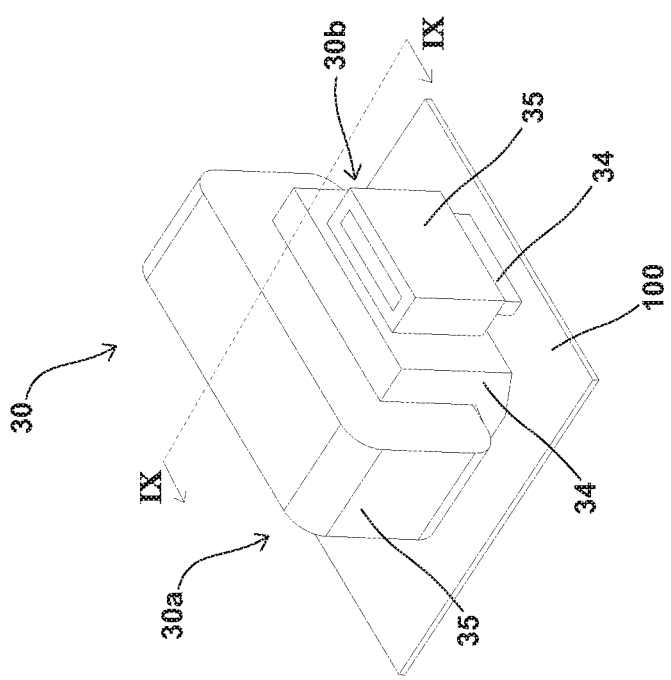
Fig.8B
Fig.8A

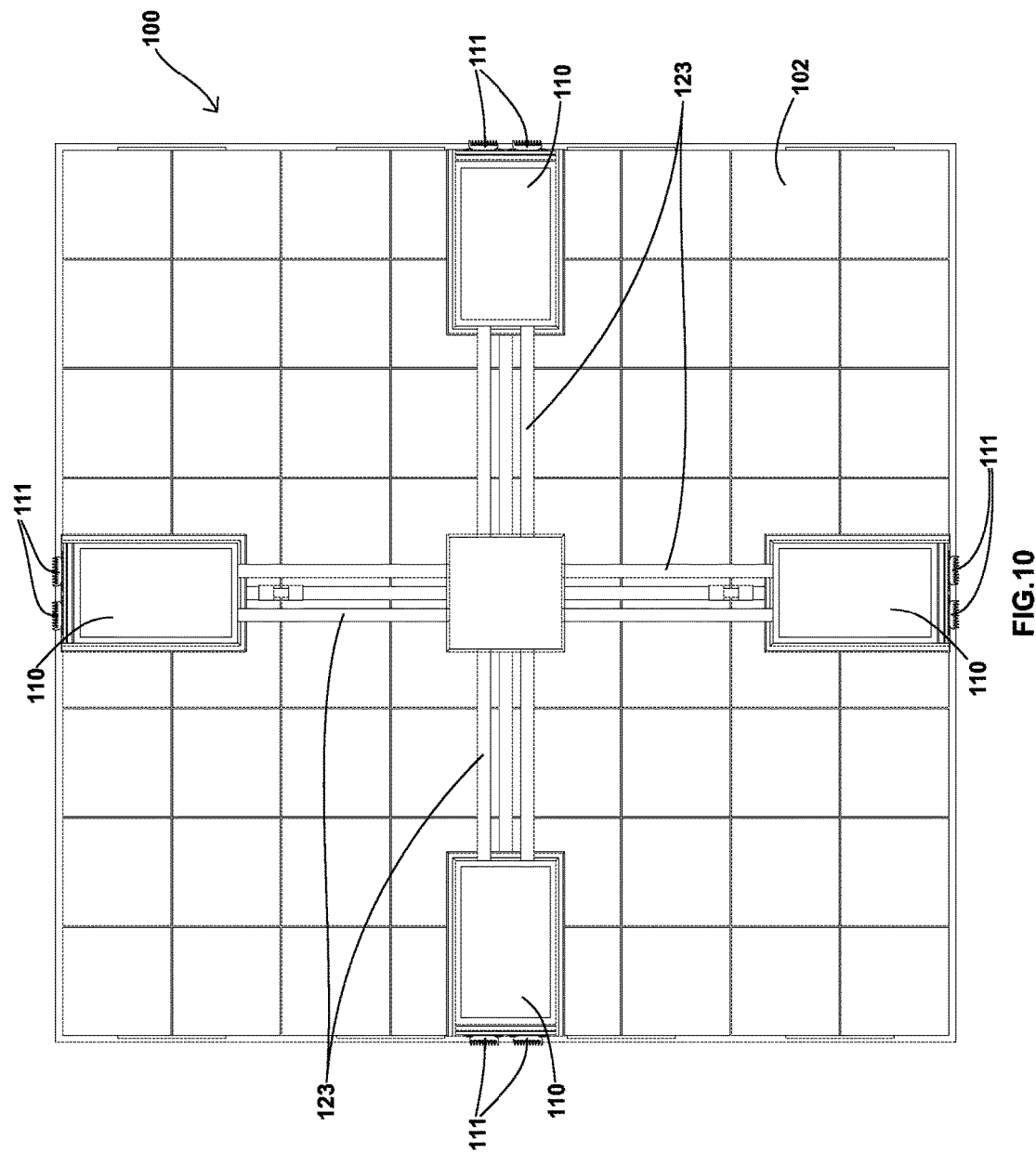

TOOLS FOR ACTUATING MAGNETICALLY-CONTROLLED CONNECTORS AND METHODS OF USE

BACKGROUND

The present application is directed to tools and, more particularly, to tools that can apply a magnetic flux to control one or more magnetic connectors to secure a panel to a support member.

Connectors are used in a variety of different applications to connect a first member to a second member. Connectors generally include some type of engagement member that is movable between an engaged position and a disengaged position. The engaged position includes the engagement member located to be secured to a second member, and the disengaged position includes the engagement member located to be unsecured from the second member.

The connectors may be used to secure a physically large and/or cumbersome object. The connector may be positioned on the object such that it is difficult for a user to access and/or to move between the engaged and disengaged positions. One example includes a connector positioned along a back side of the panel. The length and width of the panel make it difficult for a user to access the connector to secure it in position. For instance, a connector on the back side of a solar panel may not be accessible to an installer once the solar panel is positioned on the top of a frame. Likewise, a connector on a back of a plywood panel may not be accessible once the panel is placed against wall studs.

A tool is needed to control the connector from the exposed first side of the panel. This would allow a user to selectively engage and disengage the connectors to secure the panel as needed.

SUMMARY

The present application is directed to tools for use on a first side of a panel configured to move connectors on a second side of the panel between engaged and disengaged positions. The tools are applied to the first side of the panel and control connectors on a second side, without the tools penetrating the panel. The tool may include a frame with arms that are connected together and that extend over a length and a width. A bottom of the tool may be configured to contact against the first side of the panel. Magnets are mounted to the arms of the frame and spaced apart along the length and the width.

The tool may be designed to provide various levels of magnetic flux to the second side of a panel to actuate the movable connectors located on or near the opposite surface of the panel. The magnetic flux may be generated by various configurations of permanent magnets and/or electromagnets. Further, the tool may emit a magnetic flux of varying strengths. The tool may provide magnetic flux to fixed locations and/or may physically move the magnetic flux into or out of actuating proximity along the panel's surface plane or perpendicular to the surface. The tool may be configured to adjust the orientation of the magnetic flux. This may include the tool being configured to adjust the positioning of the magnets, such as physically rotating the magnet. This may also include being configured to reverse the electrical polarity for an electromagnet. The tool may be further configured to control the flux to locations in unison, or to sequence the emitted flux.

One embodiment is directed to a tool for use on a first side of a panel configured to move connectors on a second side of the panel between engaged and disengaged positions. The tool includes a frame with arms that are connected together. The frame extends over an area having a length and a width that is divided into a first section, a second section, a third section, and a fourth section. The frame also includes a bottom configured to contact against the first side of the panel. Magnets are mounted to the arms of the frame and spaced apart along the length and the width of the frame. The magnets include a first magnet positioned on the first section and configured to apply a first magnetic flux to a first area of the second side of the panel, a second magnet positioned on the second section and configured to apply a second magnetic flux to a second area of the second side of the panel, a third magnet positioned on the third section and configured to apply a third magnetic flux to a third area of the second side of the panel, and a fourth magnet positioned on the fourth section and configured to apply a fourth magnetic flux to a fourth area of the second side of the panel.

The tool may include that the magnets are spaced apart on the frame and aligned a common distance from the bottom of the frame.

The tool may include that each of the first, second, third, and fourth magnets includes at least one permanent magnet.

The tool may include that each of the first, second, third, and fourth magnets includes at least one electromagnet. The one or more electromagnets may include a core and winding that wraps around the core with the core having first and second arms that are spaced apart by a gap.

The tool may include that at least one of the first, second, third, and fourth magnets includes an electromagnet with at least two magnetic groups that emit different levels of magnetic flux.

The tool may include that each of the first, second, third, and fourth magnets is positioned along an outer frame and are spaced outward from an inner frame that is positioned inward from the outer frame.

The tool may include that each of the first, second, third, and fourth magnets is the same.

The tool may also include an energy storage device electrically connected to at least one of the first, second, third, and fourth magnets, and a switch positioned on the frame to selectively control an amount of current supplied by the energy storage device to the magnets. The switch may be configured to be positioned at one of the following settings: an off setting in which no current is supplied from the energy storage device to the magnets; a low level setting in which a first amount of current is supplied to the magnets; and a pulse setting in which the current is supplied to the magnets in a single pulse or series of pulses that each supply a second amount of current that is greater than the first amount of current.

Another embodiment is directed to a tool for use on a first side of a panel configured to move connectors on a second side of the panel between engaged and disengaged positions. The tool includes a frame with arms that are connected together and that extend over an area having a length and a width. Electromagnets are mounted to the arms of the frame and spaced apart along the length and the width of the frame. An energy storage device is positioned on the frame and electrically connected to the electromagnets. A switch is positioned on the frame to selectively control an amount of current supplied by the energy storage device to the electromagnets.

The tool may include that the switch is positionable between: an off setting in which no current is supplied from the energy storage device to the electromagnets; a low level setting in which a first amount of current is supplied to the electromagnets; and a pulse setting in which current is supplied to the electromagnets in a series of pulses that each supplied a second amount of current to the electromagnets that is greater than the first amount of current.

The tool may include that the frame has a flat bottom configured to contact against the first side of the panel with the electromagnets positioned on the frame an equal distance from the bottom.

The tool may include that the electromagnets include a first magnet with a first group of electromagnets and a second group of electromagnets, the first group of electromagnets is configured to emit a first amount of magnetic flux and the second group of electromagnets is configured to emit a different second amount of magnetic flux.

The tool may include at least one permanent magnet mounted to the arms of the frame.

The tool may include that each of the electromagnets includes a core and winding that wraps around the core and the core includes first and second arms that are spaced apart by a gap.

Another embodiment is directed to a tool for use on a first side of a panel configured to move connectors on a second side of the panel between engaged and disengaged positions. The tool includes a frame with arms that are connected together and that extend over an area having a length and a width. An electromagnet is mounted to the arms of the frame and spaced apart along the length and the width of the frame. An energy storage device is positioned on the frame and electrically connected to the electromagnet. A switch is positioned on the frame to selectively control an amount of current supplied by the energy storage device to the electromagnet.

The tool may include that the switch is positionable at different settings to control an amount of current supplied to the electromagnet from the energy storage device.

The tool may include that the electromagnet includes a first group of electromagnets and a second group of electromagnets with the first group of electromagnets configured to emit a first amount of magnetic flux and the second group of electromagnets configured to emit a different second amount of magnetic flux.

The tool may include at least one permanent magnet mounted to the arms of the frame.

The tool may include that the electromagnet includes a core and winding that wraps around the core, and that the core includes first and second arms that are spaced apart by a gap.

The various aspects of the various embodiments may be used alone or in any combination, as is desired.

BRIEF DESCRIPTION OF THE DRAWINGS

FIG. 6 is a schematic diagram of a power circuit of a tool.

FIG. 7 is a schematic view of a magnet that includes groups of magnets.

FIG. 8A is a perspective view of magnets.

FIG. 8B is a sectional view of the magnets of FIG. 8A.

FIG. 10 is a bottom view of a panel that includes multiple connectors.

DETAILED DESCRIPTION

The present application is directed to a tool for selectively engaging and disengaging one or more magnetic connectors to secure a panel. The tool includes a frame with one or more magnets. The magnets provide a magnetic flux to control the magnetic connectors.

Figure 1:
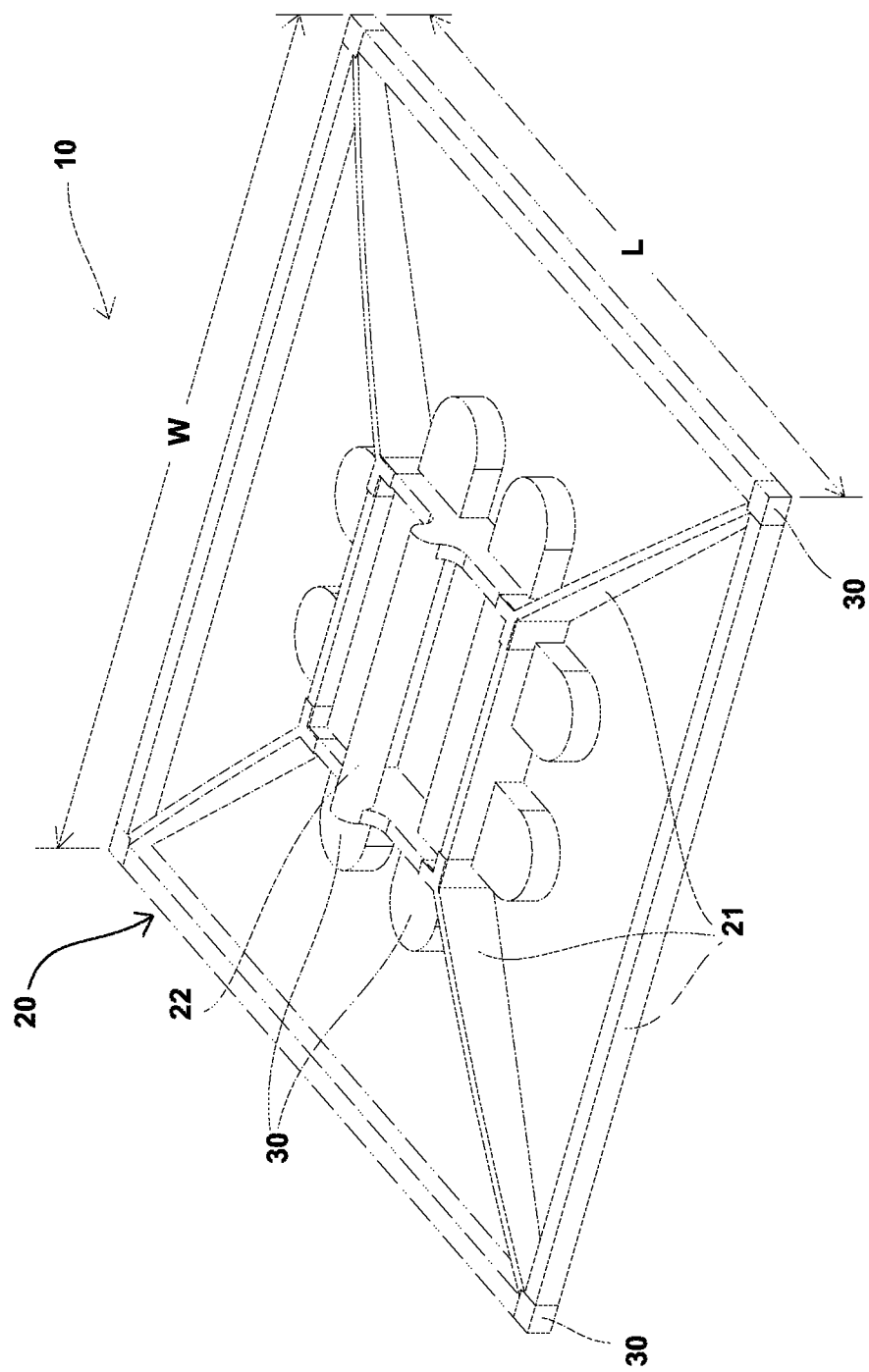
FIG. 1 is a perspective view of a tool.

FIG. 1 illustrates a magnetic flux tool 10. The tool 10 includes a frame 20 that includes arms 21 that extend over an area with a length L and width W. The frame 20 may include a handle 22 that is grasped by the user. One or more magnets 30 are attached to the frame 20. The magnets 30 are configured to apply a magnetic flux to one or more nearby connectors. The magnets 30 may be the same or may be two or more different magnets 30 that are positioned throughout the frame 20. When the tool 10 is positioned in proximity to a magnetically-actuated connector, the tool 10 applies a magnetic flux to control the position of the connector.

Figure 2:
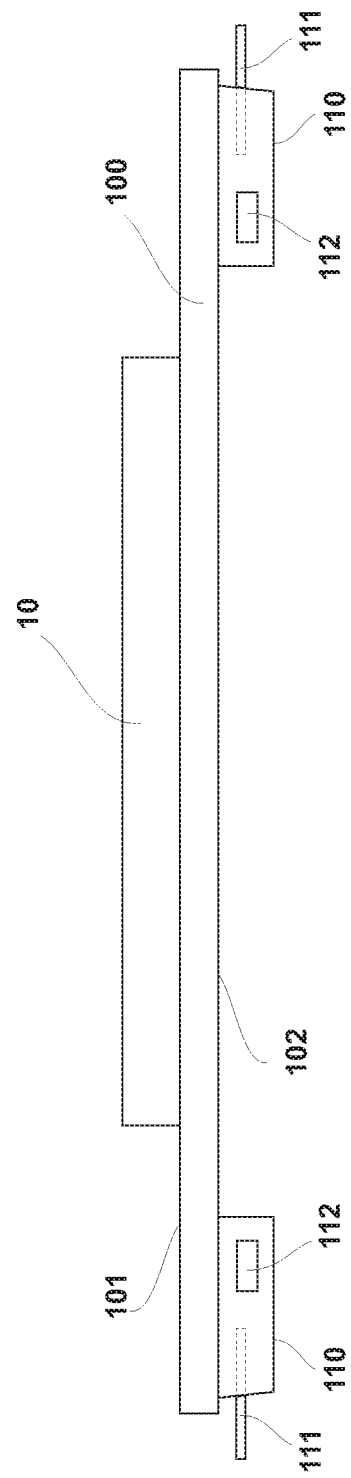
FIG. 2 is a side schematic view of a tool on panel that include includes a pair of connectors

FIG. 2 illustrates the tool 10 in use with a panel 100. The panel 100 is a relatively thin, flat object with a first side 101 and an opposing second side 102. The panel 100 may include a relatively large length and width and have a relatively large surface area. The tool 10 is configured to be positioned on the first side 101 of the panel 100. This may include placing the tool 10 against the first side 101, or spaced away from and in proximity to the first side 101. One or more connectors 110 are positioned on the second side 102, and may be secured to the panel 100 in various manners. Each of the connectors 110 includes an engagement member 111 that is positionable between an extended orientation (illustrated in solid lines in FIG. 2) to engage with an outside member and a retracted orientation (illustrated in dashed lines in FIG. 2) to disengage from the outside member. Each connector 110 also includes an acting member 112. The acting member 112 is acted upon by the magnetic flux that is emitted from tool 10. The acting member 112 is operatively connected to the one or more engagement members 111 and configured to move the engagement members 111 between the extended and retracted orientations.

Figure 3:
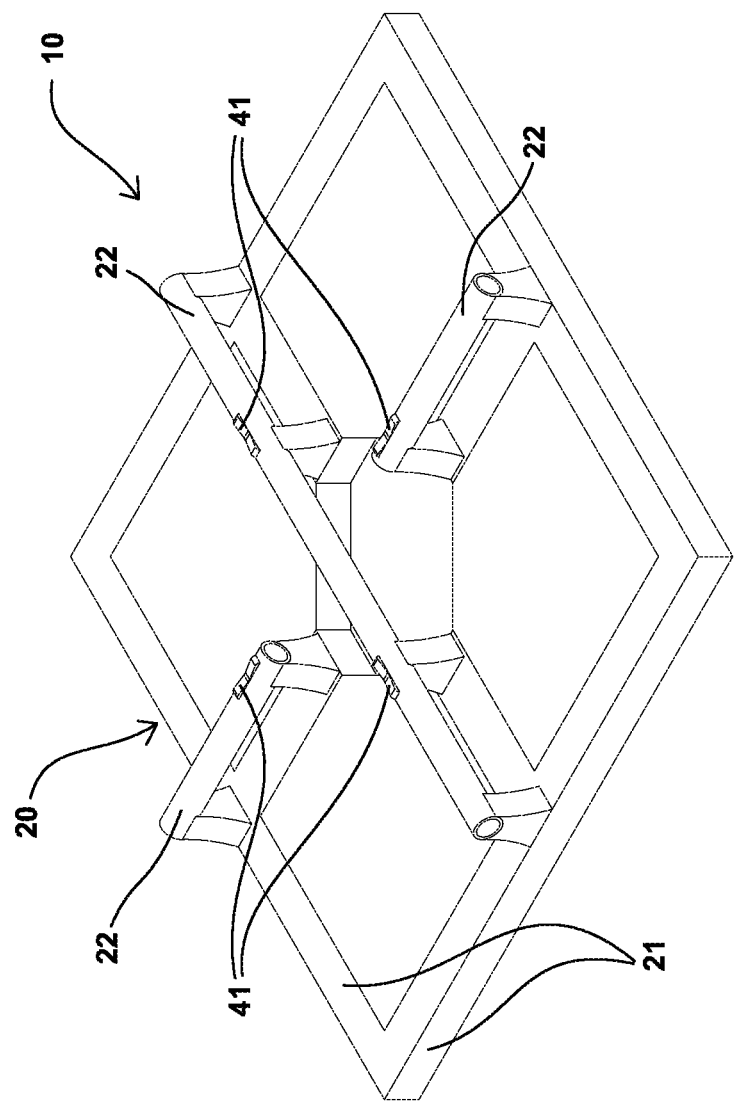
FIG. 3 is a perspective view of a tool

The frame 20 is sized to position the magnets 30 at various locations on the panel 100 to provide a magnetic flux to one or more connectors 110. The frame 20 is constructed from arms 21 that extend over an area which is defined by a length L and a width W. FIGS. 1 and 3 illustrate tools 10 that have frames 20 that are rectangular in shape. The tool 10 may include a variety of different shapes depending upon the context of use. Examples include but are not limited to circle shape, oval shape, and triangular shape. The bottom of the frame 20 may be flat to facilitate sliding the tool 10 along the first surface 101 of the panel 100 and/or securing the tool 10 to the first side 101 of the panel 100. The frame 20 may include one or more handles 22 that are attached to one or more of the arms 21.

Figure 4:
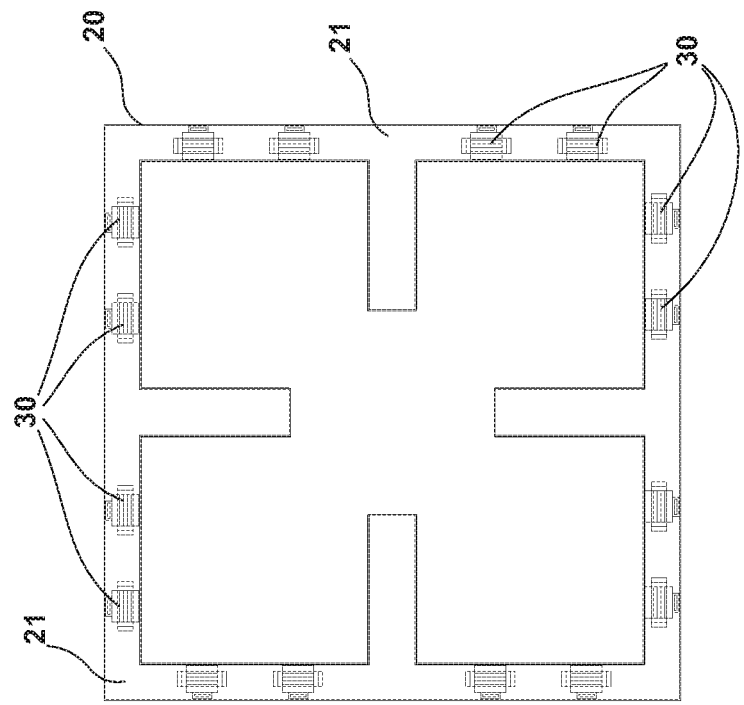
FIG. 4 is a top schematic view of a tool with magnets positioned about a frame of the tool.
Figure 5:
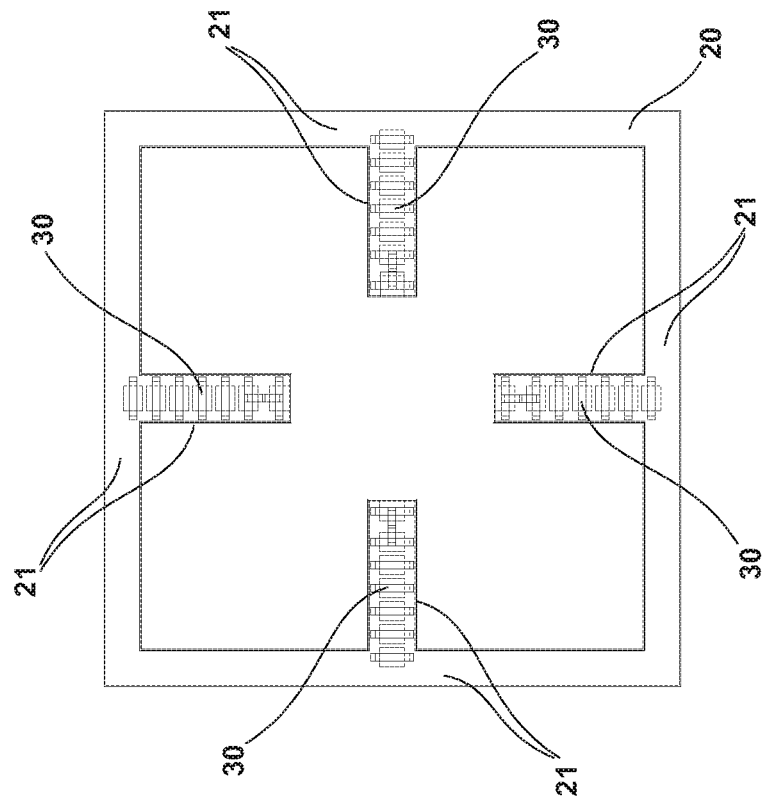
FIG. 5 is a top schematic view of a tool with magnets positioned about a frame of the tool.

One or more magnets 30 are attached to the frame 20. The magnets 30 may be attached at various positions on the frame 20, including but not limited to being attached within the interior of a hollow arm 21 and being mounted to the exterior of an arm 21. FIG. 4 illustrates a frame 20 that includes arms 21 that form an exterior section in the shape of a rectangle and arms 21 that extend inward towards a center of the frame 20. Magnets 30 are positioned at each of the interior arms 21 and are spread apart across an area of the frame 20. FIG. 5 illustrates a frame 20 with magnets 30 positioned within the arms 21 that form the exterior section, with no magnets positioned on the interior arms 21. The magnets 30 are again spread out across an area of the frame 20. The magnets 30 may be positioned at a variety of different locations and arrangement on the frame 20.

The tool 10 may include a variety of different arrangement of magnets 30. The tool 10 may include a single magnet 30. Embodiments with multiple magnets 30 may include each of the same type of magnet 30, or a variety of different magnets 30. The different types of magnets 30 may be segregated on the frame 20, or may be interspersed in a variety of different configurations.

The frame 20 may be divided into different sections with magnets 30 positioned within each of the sections. In one embodiment, the frame 20 extends across an area with a length and a width. The area is divided into sections (e.g., quadrants) across the area. Each of the sections may include the same size, or the sections may include different sizes. Magnets 30 are positioned in each of the different sections.

One type of magnet 30 is a permanent magnet 30. The permanent magnet 30 is constructed from a magnetized material that produces a persistent magnetic field. The magnet 30 may be constructed from a ferromagnetic material, such as but not limited to iron, nickel, neodymium, and cobalt. When the permanent magnet 30 is brought into proximity to the connector on the panel 100, the magnetic flux causes the connector to move positions.

One or more of the magnets 30 may be electromagnets 30. Electromagnets 30 are made from a wire coil 34. In some embodiments, the wire coil 34 is wrapped around a core 35. The electromagnet 30 produces a magnetic flux when current is supplied to the wire coil 34. The core 35 may be constructed from a ferromagnetic material to greatly enhance the produced magnet flux.

The tool 10 is configured to apply electrical power to the electromagnets 30. FIG. 6 illustrates a schematic diagram of a power circuit 40 in the tool 10 to power the one or more magnets 30. A power source 50 is attached to the frame 20. This may include the power source 50 positioned along a central region of the frame 20. A variety of different power sources 50 may be used with the tool 10, including but not limited to single-use and rechargeable batteries. The tool 50 may also be configured to plug into a conventional AC power source.

FIG. 6 includes a single power source 50 that provides power to each of the magnets 30. The tool 10 may also include multiple power sources 50 that provide power to the magnets 30. A separate power source 50 may provide power to individual magnets 30, or a subset of the total magnets 30.

The tool 10 also includes a switch 41 for the user to control the power supplied to the magnets 30. As illustrated on FIG. 3, the switch 41 may be positioned on the handle 22 on the frame 20 to facilitate control by the user. The tool 10 may include a single switch 41 as schematically illustrated in FIG. 6 to control the power to each of the magnets 30. Other embodiments include multiple switches 41 to separately control the power provided to one or more of the magnets 30. Multiple switches 41 provide for powering the individual magnets 30 without providing power to all the magnets 30. This may be needed to actuate a limited one or more of the connectors 110 without actuating all the connectors 110.

The one or more switches 41 may include different settings that provide power to the one or more magnets 30 in different manners. This may include a low level setting that provides a limited amount of electrical power to the magnets 30. Another setting includes a high level setting that provides a higher level of electrical power. A third setting may include a holding level that supplies an amount of power to maintain a desired position of a connector. An off setting stops the supply of power.

The power circuit 40 may also include one or more capacitors and relays to control the power supplied to one or more of the magnets 30. The power circuit 40 may be configured to pulse the power that is supplied to the one or more magnets 30.

The magnets 30 may be positioned in groups that are each positioned to provide a magnetic flux to different sections of a connector 110 that is positioned on the second side of the panel 100. FIG. 7 illustrates a magnet 30 that includes a first magnet group 30a and a second magnet group 30b. This magnet 30 is illustrated in FIG. 4. The first group 30a includes six of the same magnets and is configured to apply a magnetic flux to a particular area and/or point of a connector 110 on the second side of the panel 100. The second group 30b includes a single magnet and is configured to apply a different magnetic flux to a different point and/or area on the connector 110. The power circuit 40 may be configured to individually power the different groups in a magnet 30. This may include a separate switch 41 for each of the different groups, or the switch to have different settings to provide the power to the selected group.

FIGS. 8A and 8B illustrate another magnet 30 that provides a magnetic flux to the second side of the panel 100. This magnet 30 is illustrated positioned in the frame 20 in FIG. 5. The magnet 30 includes a first group including magnet 30a and a second group including magnet 30b. Each of the magnets 30a, 30b is configured to apply a magnetic flux to a different acting member 112 in the connector 110 attached to the second side 102 of the panel 100. The first magnet 30a includes a coil 34 and a core 35. The core 34 is shaped to include arms 32 that extend outward from a central section 36 within the coil 35. As best illustrated in FIG. 8B, each of the arms 32 terminates at a tip 33. The tips 33 of configured to direct the magnetic flux to a specific location and/or area to control the acting member 112 in the connector 110.

The second magnet 30b is configured to apply a magnetic flux to control a second acting member 112. The core 34 is shaped to direct the magnetic flux to control the second acting member 112.

The one or more magnets 30 may emit the magnetic flux in a direction that is perpendicular to the panel 100. One or more of the magnets 30 may be further configured to emit the magnetic flux at an angle relative to the panel 100. Embodiments include the magnets 30 set at angles between 0°-45° relative to a plane that is normal to the panel 100.

One or more of the magnets 30 may be adjustable to control the angle at which the magnetic flux is emitted relative to the panel 100. The one or more magnets 30 may be pivotally connected to the frame 20 to be adjustable by the user as necessary. This may include the user physically contacting and physically rotating the magnets 30.

The tool 10 may also be configured to change the polarity of one or more of the magnets 30. For a permanent magnet 30, this may include rotating the magnet 30 to change the polarity, such as rotating it 180° within the frame 20. For electromagnets 30, the electrical polarity of the power that is supplied may be reversed. The tool 10 may be further configured to control the flux to locations in unison, or to sequence the emitted flux.

Figure 9:
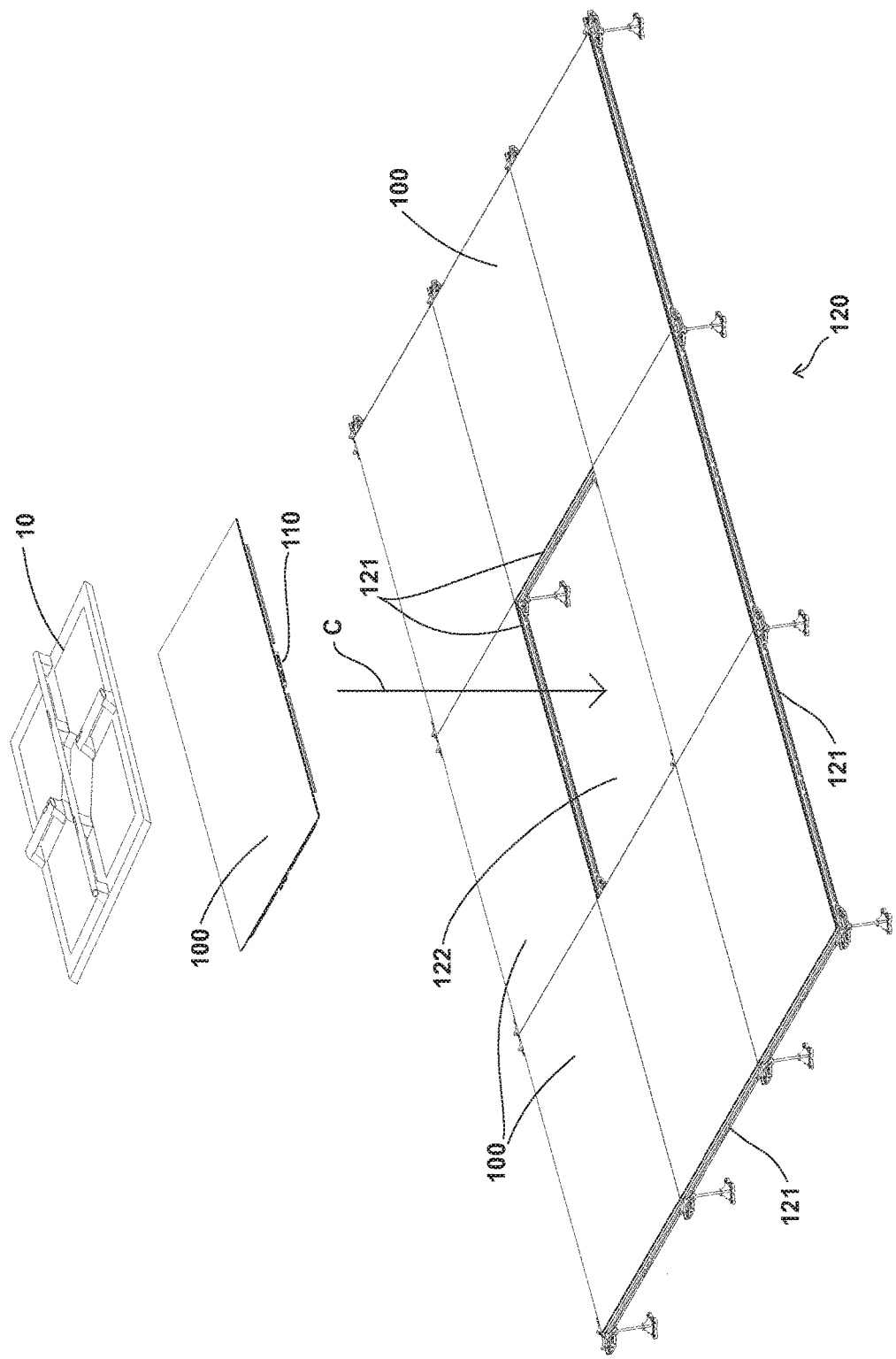
FIG. 9 is an exploded view of a panel removed from a solar array and a tool used with the panel.

FIGS. 9-11 illustrate how the tool 10 is used to position a panel 100. The embodiment of FIG. 9 includes solar panels 100 that are mounted in a frame 121 to form a solar array 120. The embodiment of FIG. 9 includes a center panel 100 being mounted into an opening 122 in the frame 121. The center panel 100 is lowered into the opening 122 in the direction indicated by arrow C. The frame 121 extends around the opening 122 and engages with the connectors 110 on the second side 102 of the panel 100 to secure the panel 100.

FIG. 10 illustrates the second side 102 of the panel 100. Connectors 110 are positioned along the sides of the panel 100. The connectors 110 are positioned such that engagement members 111 of the connectors 110 engage with the frame 121 when the connectors 110 are in the engaged position. Although FIG. 10 includes the engagement members 111 in an extended position, the engagement members 111 would be retracted in a disengaged position prior to insertion of the panel 100 in the frame 121. Electrical connectors 123 may also extend to the connectors 110 along the second side 102 of the panel 100. The electrical connectors 123 are connected to the engagement members 111 such that electrical power produced at the solar panel 100 is transferred to the frame 121 when the connectors 110 are extended in the engaged position.

Figure 11B:
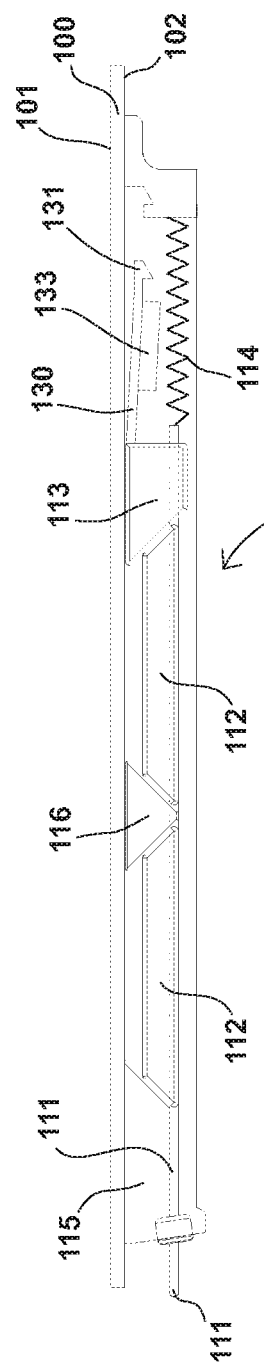
FIG. 11B is a side schematic view of a connector in an engaged position.
Figure 11A:
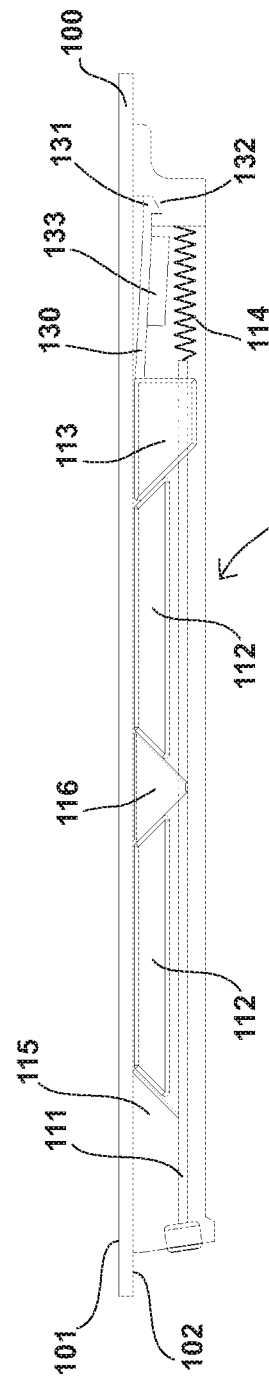
FIG. 11A is a side schematic view of a connector in a disengaged position.

FIGS. 11A and 11B illustrate a connector 110 that is attached to the second side 102 of the solar panel 100. The connector 110 includes one or more engagement members 111 that are connected to a movable contact member 113. Thus movement of the contact member 113 results in movement of the engagement member 111 between the extended engaged position and the retracted disengaged position. One or more biasing members 114 contact against the contact member 113 to apply a biasing force. A fixed support 115 is spaced away from the movable contact member 113. A movable intermediate contact member 116 is positioned between the contact members 113, 115. Acting members 112 in the shape of wedges are positioned between the members 113, 115 and each has one or more ramped surfaces that are in contact. The acting members 112 are constructed from a ferromagnetic material and are magnetically attracted to the magnets 30 of the tool 10.

The connector 110 also includes a lock to secure the connector in the retracted disengaged orientation. The lock includes an arm 130 with one or more teeth 131 at a distal end. A ferromagnetic member 133 is positioned on the arm 130. A receptacle 132 is formed in the body of the connector 110 and is configured to receive the one or more teeth 131.

This connector 110 includes a pair of acting members 112, although other embodiments may include a single member 112, or three or more members 112. Examples of connectors for use on a panel are disclosed in U.S. Ser. No. 15/401,868 titled "Magnetically-Controlled Connectors and Methods of Use" filed on Jan. 9, 2017, and which is hereby incorporated by reference in its entirety.

Prior to installation of the panel 100 in the array 120, the connectors 110 may be in the retracted disengaged position as illustrated in FIG. 11A. The user places the panel 100 into the opening 122 in the array 120 with the edges of the panel 100 positioned along the frame 121. Once in position, the user positions the tool 10 in proximity to the first side 101 of the panel 100. This may include positioning the tool 10 against the first side 101, or closely spaced away from the first side 101. In another embodiment, the tool 10 may be attached to the panel 100 prior to positioning in the array 120. The tool 10 may then be used by the user to manipulate the panel 100 as necessary.

The tool 10 may be used to selectively position the connectors 10 between the extended and retracted orientations. In one embodiment, the connectors 110 are originally in the retracted disengaged position as illustrated in FIG. 11A. The tool 10 unlocks the lock by raising the arm 130 and causing the one of more teeth 131 to disengage from the receptacle 132. The tool 10 may then be deactivated either by moving the tool 10 away from the panel 100, or by the user moving one or more of the switches 41 and stopping the power supplied to one or more of the electromagnets 30. Once the connector 110 is unlocked, the one or more biasing members 114 apply a force to the contact member 113 that biases the engagement member 111 outward such that the distal end extends outward from the connector body and into engagement with the frame 121 as illustrated in FIG. 11B.

To unlock the connector using a tool 10 having a permanent magnet 30, the magnet 30 is brought into proximity of the lock. The magnetic flux of the magnet 30 causes the material 133 on the arm 130 to be attracted and to move the arm 130 upward relative to the body of the connector and disengage the one or more teeth 131 from the receptacle 132. For a tool featuring an electromagnet 30, the user may engage a switch 41 causing power from the power source 50 to be supplied to the magnet 30. This creates a magnetic flux from the magnet that attracts the material 133 and disengages the arm 130.

In one embodiment in which the tool 10 includes groups of electromagnets 30 as illustrated in FIG. 7, just one of the groups may be activated to unlock the lock. This includes providing current to just one of the groups without supplying current to the other. By way of example and using the magnet 30 of FIG. 7, power may be supplied to just the second group 30b. This single magnet 30b is adequate to attract the material 133 and disengage the arm 130.

Once the panel 100 is secured in the frame 121, the tool 10 may also be used to disengage the panel 100. When engaged, the connector 110 is in the extended position as illustrated in FIG. 11B. The tool 10 is again brought into proximity of the first side 101 of the panel 100. The tool 10 then applies a magnetic flux to the one or more acting members 112 to attract the one or more members 112 towards the tool 10. This movement causes the various ramped surfaces on the members 112 and contact members 113, 115, 116 to slide across one another. This movement causes the member 113 to move against the force of the one or more biasing members 114 to the retracted disengaged position as illustrated in FIG. 11A. The connector 110 will remain in this position as long as the magnetic flux is applied to the one or more members 112. In one embodiment, the movement of the acting members 112 may also cause the lock to re-engage with the one or more teeth 131 being positioned in the receptacle 132.

The tool 10 may apply different amounts of electrical power to the panel 100 depending upon the desired need. A low level of power may be applied that secures the tool 10 to the panel 100 to allow the user to use the tool 10 to manipulate and position the panel 100. A high level of electrical power may be applied to move the connector 110 between the engaged and disengaged positions. A holding level may be applied once the lock has been unlocked. The holding level maintains the connector 110 in a particular position.

One aspect includes the tool 10 used with a solar panel 100, with other aspects including other types of panels 100 that require electrical and/or physical connection to a support member frame 121.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A tool for use on a first side of a panel configured to move connectors on a second side of the panel between engaged and disengaged positions, the tool comprising:
    a frame comprising arms that are connected together, the frame extending over an area having a length and a width that is divided into a first section, a second section, a third section, and a fourth section, the frame further comprising a bottom configured to contact against the first side of the panel;
    magnets mounted to the arms of the frame and spaced apart along the length and the width of the frame, the magnets comprising:
        a first electromagnet positioned on the first section and configured to apply a first magnetic flux to a first area of the second side of the panel;
        a second electromagnet positioned on the second section and configured to apply a second magnetic flux to a second area of the second side of the panel;
        a third electromagnet positioned on the third section and configured to apply a third magnetic flux to a third area of the second side of the panel;
        a fourth permanent magnet positioned on the fourth section and configured to apply a fourth magnetic flux to a fourth area of the second side of the panel;
    a power circuit that controls power to each of the first, second, and third electromagnets;
    wherein each of the electromagnets is configured to apply a different magnetic flux;
    wherein the power circuit is configured to individually power the electromagnets to apply the different magnetic flux to different areas on the second side of the panel.

2. The tool of claim 1, wherein the magnets being spaced apart on the frame and aligned a common distance from the bottom of the frame.

3. The tool of claim 1, wherein each of the electromagnets comprises a core and winding that wraps around the core, the core comprises first and second arms that are spaced apart by a gap.

4. The tool of claim 1, wherein each of the first, second, and third electromagnets is the same.

5. The tool of claim 1, further comprising:
    an energy storage device electrically connected to at least one of the first, second, and third electromagnets; and
    a switch positioned on the frame to selectively control an amount of current supplied by the energy storage device to the first, second, and third electromagnets.

6. The tool of claim 5, wherein the switch is configured to be positioned at one of the following settings:
    an off setting in which no current is supplied from the energy storage device to the first, second, and third electromagnets;
    a low level setting in which a first amount of current is supplied to the at least one of the first, second, and third electromagnets; and
    a pulse setting in which the current is supplied to the at least one of the first, second, and third electromagnets in a series of pulses that each supply a second amount of current that is greater than the first amount of current.

7. A tool for use on a first side of a panel configured to move connectors on a second side of the panel between engaged and disengaged positions, the tool comprising:
    a frame with arms that are connected together and that extend over an area having a length and a width;
    electromagnets mounted to the arms of the frame and spaced apart along the length and the width of the frame;
    an energy storage device positioned on the frame and electrically connected to the electromagnets;
    a switch positioned on the frame to selectively control an amount of current supplied by the energy storage device to the electromagnets; and
    at least one permanent magnet mounted to the frame.

8. The tool of claim 7, wherein the switch is positionable between:
    an off setting in which no current is supplied from the energy storage device to the electromagnets;
    a low level setting in which a first amount of current is supplied to the electromagnets; and
    a pulse setting in which current is supplied to the electromagnets in a single pulse or a series of pulses that each supply a second amount of current to the electromagnets that is greater than the first amount of current.

9. The tool of claim 7, wherein the frame includes a flat bottom configured to contact against the first side of the panel, the electromagnets positioned on the frame an equal distance from the bottom.

10. The tool of claim 7, wherein the electromagnets includes a first magnet with a first group of electromagnets and a second group of electromagnets, the first group of electromagnets configured to emit a first amount of magnetic flux and the second group of electromagnets configured to emit a different second amount of magnetic flux.

11. The tool of claim 7, wherein each of the electromagnets comprise a core and winding that wraps around the core, the core comprises first and second arms that are spaced apart by a gap.

12. A tool for use on a first side of a panel configured to move connectors on a second side of the panel between engaged and disengaged positions, the tool comprising:
    a frame with arms that are connected together and that extend over an area having a length and a width;
    an electromagnet mounted to the arms of the frame and spaced apart along the length and the width of the frame;

an energy storage device positioned on the frame and electrically connected to the electromagnet;

a switch positioned on the frame to selectively control an amount of current supplied by the energy storage device to the electromagnet; and at least one permanent magnet mounted to the frame.

13. The tool of claim 12, wherein the switch is positionable at different settings to control an amount of current supplied to the electromagnet from the energy storage device.

14. The tool of claim 12, wherein the electromagnet includes a first group of electromagnets and a second group of electromagnets, the first group of electromagnets configured to emit a first amount of magnetic flux and the second group of electromagnets configured to emit a different second amount of magnetic flux.

15. The tool of claim 12, wherein the electromagnet comprises a core and winding that wraps around the core, the core comprises first and second arms that are spaced apart by a gap.

\* \* \* \* \*